Patented May 31, 1949

2,471,927

UNITED STATES PATENT OFFICE 2,471,927

PREPARATION OF METHACRYLONITRILE FROM α-AMINOISOBUTYRALDOXIMES

Newman M. Bortnick, Philadelphia, and Darrel J. Butterbaugh, Abington, Pa., assignors to Rohm & Haas Company, Philadelphia, Pa., a corporation of Delaware No Drawing. Application December 18, 1947, Serial No. 792,598

6 Claims. (Cl. 260—465.9)

This invention deals with the preparation of methacrylonitrile. More specifically, it concerns preparing methacrylonitrile by the pyrolysis of tertiary α-aminoisobutyraldoximes.

As shown in application Serial No. 792,597, filed on even date, tertiary α-aminoisobutyraldoximes are formed by reacting at temperatures of 0° to 90° C. secondary amines and the dimeric addition product from equimolecular proportions of nitrosyl chloride and isobutene, 2-methylpropene. This reaction yields well-defined compounds which correspond in composition to the structure

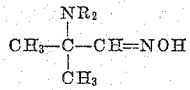

wherein R is a hydrocarbon group, including aliphatic, cycloaliphatic, and arylaliphatic groups, such as methyl, ethyl, butyl, octyl, dodecyl, allyl, undecenyl, cyclohexyl, benzyl, etc. For the purpose of the preparation of methacrylonitrile, R is preferably an alkyl group of one to four carbon atoms but is not limited thereto. The R substituents may be taken together as a divalent hydrocarbon group or an ether group which forms a heterocycle with the nitrogen, as in piperidine, pyrrolidine, or morpholine.

It is now found that these tertiary α-aminoisobutyraldoximes yield methacrylonitrile when vapors therefrom are heated at 275° C to 425° C. with a solid, dehydrating catalyst. Secondary amines and other nitrogenous bodies result during the pyrolysis and are desirably taken up with a strong inorganic acid. The crude methacrylonitrile may then be purified by such steps as washing with a solution of an alkaline hydroxide, washing with a solution containing a soluble bisulfite, and fractionation by distillation.

The heating in the presence of a dehydrating catalyst may be done at normal atmospheric pressure or at increased or reduced pressures. The vapors may be passed over or through the catalyst at space velocities from one hundred to one thousand.

Typical catalysts which may be used include aluminum oxide catalysts in the so-called gel form, acid-treated clays, bauxites, silica gels, and alumina-silica gels. A preferred type of catalyst is a silica gel precipitated with excess of a strong inorganic acid which is not readily volatilized, such as phosphoric acid or pyrophosphoric acid. In a typical preparation of such a catalyst, there is poured into a hot 5% solution of phosphoric acid, with stirring, a less than equivalent amount of sodium silicate in water solution. The resulting mixture is vigorously stirred and the mass filtered. The filter cake is then suspended in water and made acid to a pH of 2 to 3.5. Again the solid material is filtered off. It is dried, crushed, and heated in a stream of air at a temperature of about 350° C. to give a very active catalyst.

The tertiary α-aminoisobutyraldoxime is heated to 175° C. to 275° C. and the vapors therefrom passed through the dehydrating catalyst which is maintained between 275° C. and 425° C. The ensuing reaction gives off heat. The vapors from the catalyst are preferably scrubbed with an acid solution to absorb the nitrogenous bodies formed, which are thereby dissolved by the solution as acid salts. Sulfuric acid is a suitable acid for this procedure. Methacrylonitrile which is formed condenses and can be separated from the acid solution as an organic layer. Any remaining methacrylonitries can be condensed from the exit gases.

The crude methacrylonitrile thus obtained may be fractionated directly, but a better procedure is to wash the crude methacrylonitrile with a strong sodium or potassium bisulfite solution or with a solution of 5% to 15% of sodium hydroxide followed by a bisulfite wash before fractionation by distillation.

Further details of the pyrolysis of tertiary α-aminoisobutyraldoximes by the method of this invention are given in the following illustrative examples.

Example 1

Molten α-dimethylaminoisobutyraldoxime was pumped into a tube which was heated by an electrical winding to 200°–225° C., where it was vaporized. The vapors then entered a catalyst zone which was maintained at 335° C. The rate of pumping was adjusted to give a vapor space velocity of 140. The catalyst used was a silica gel giving a pH of 4. The gases from the catalyst zone were sprayed with a 5% sulfuric acid solution. There was collected therefrom an oil layer which was fractionated through a packed column. A yield of 53.5% of methacrylonitrile was obtained.

Example 2

Molten α-dimethylaminoisobutyraldoxime was pumped into an electrically heated tube at a rate to give a space velocity of 195. The tube was maintained at 225°–250° C. The vapors therefrom passed through a catalyst zone containing silica gel at 330° C. and were condensed in a cold tube. The condensate thus obtained was directly distilled and its various components collected and estimated quantitatively. With reference to the amount of dimethylaminoisobutyraldoxime used, there were obtained water in a yield of 102%, methacrylonitrile in a yield of 49.7%, dimethylaminoisobutyronitrile in a yield of 16.5%, dimethylamine in a yield of 70.3%, and a residue amounting to 7.6% of the starting material, all on a weight basis.

The dimethylaminoisobutyronitrile resulting from combination of methacrylonitrile and dimethylamine was converted by heating the amine sulfate at 175° C. to the desired methacrylonitrile in a yield of 80%, increasing the total yield of methacrylonitrile to 63%.

*Example 3*

There was pumped into an electrically heated tube a continuous supply of 2-N-dimethylaminoisobutyraldoxime at the rate of 2.4 grams per minute. This amino-oxime was vaporized and passed through a bed of powdered silica gel precipitated with phosphoric acid from a water glass solution and adjusted to a pH of 2.3. The space velocity was 340 and the temperature of the catalyst zone, 418° C. The vapors from the catalyst zone were scrubbed with a 15% sulfuric acid solution, which was recycled with cooling. The amine in the vapor was thereby dissolved and the other organic constituents condensed. They were separated as an organic layer, which was washed with a 25% sodium bisulfite solution and then distilled. The yield of methacrylonitrile was 66%.

*Example 4*

The procedure of Example 3 was repeated with a space velocity of 202 and catalyst temperature of 354° C. The yield of methacrylonitrile was 68.5%.

*Example 5*

The procedure of Example 3 was repeated with a space velocity of 380 and a catalyst temperature of 342° C. The yield of methacrylonitrile was 70.7%.

*Example 6*

The procedure of Example 3 was repeated with a space velocity of 262 and a catalyst temperature of 370° C. The yield was 74.5%.

*Example 7*

The general procedure of Examples 3 to 6 was followed, except that the pressure within the apparatus was reduced to 300 mm. The lower pressure was used with the intent of reducing the evident decomposition which occurred when liquid dimethylaminoisobutyraldoxime entered the heated tube. The vapors passed through the catalyst zone containing silica gel of pH 3.5 at a space velocity of 208. The temperature of the catalyst was 314° C. The yield of methacrylonitrile was 73.5%. Residue amounted to only 5.2%.

*Example 8*

Substitution of activated alumina for silica was made and the same general procedure followed as described above. With a space velocity of 285 and catalyst temperature of 280° C., the yield of methacrylonitrile was 67.5%.

*Example 9*

Powdered bauxite was used in place of the previous catalysts. With a space velocity of 285 and a catalyst temperature of 394° C., a yield of methacrylonitrile of 47.2% was obtained.

In place of 2-N-dimethylaminoisobutyraldoxime, there may be used any other tertiary α-aminoisobutyraldoxime at normal or reduced pressure. Thus, there may be used an oxime of the preferred class having lower alkyl groups as N-substituents, as in diethylaminoisobutyraldoxime, dipropylaminoisobutyraldoxime, or dibutylaminoisobutyraldoxime, or there may be used oximes with other N-substituents, including larger alkyl groups such as amyl, hexyl, octyl, or dodecyl groups, which may be straight or branched, or groups containing carbocycles such as cyclohexyl or benzyl. Again, α-aminoisobutyraldoximes may be used which are formed from piperidine, pyrrolidine, or morpholine.

The conditions under which these various α-aminoisobutyraldoximes are decomposed may be varied as to temperature and pressure, higher temperatures for the initial vaporization and lower pressures than atmospheric being often desirable with increasing molecular size of the α-aminoisobutyraldoximes. With such oximes, the amount of decomposition may increase in the vaporizing zone, but the gaseous products therefrom still yield methacrylonitrile by the described procedure.

The following example will show the procedure with heterocyclic α-aminoisobutyraldoximes.

*Example 10*

There was pumped into a heated tube a continuous supply of α-piperidinoisobutyraldoxime. The tube was wound externally with a resistance element by which a temperature of 225° C. to 250° C. was maintained. Vapors formed and were passed at a space velocity of about two hundred through a catalyst zone containing an acidic silica gel. The catalyst zone was maintained at about 350° C. The vapors from the catalyst zone were scrubbed with dilute phosphoric acid. The organic materials were condensed and separated. A 45% yield of methacrylonitrile was thus obtained.

The various α-aminoisobutyraldoximes which yield methacrylonitrile when heated at 175° C. to 275° C., with the resulting vapors being passed over a dehydrating catalyst at 275° C. to 425° C., are desirably summarized by the formula

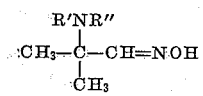

wherein R' and R" represent individually hydrocarbon groups, preferably of not over eighteen carbon atoms, and together represent divalent hydrocarbon and ether chains which jointly with the nitrogen atom form heterocycles.

I claim:

1. The process of preparing methacrylonitrile which comprises heating an α-dialkylaminoisobutyraldoxime at 275° to 425° C. in the presence of a dehydrating catalyst.

2. The process of preparing methacrylonitrile which comprises heating a compound of the formula

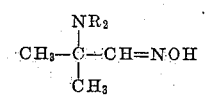

wherein R is an alkyl group of one to four carbon atoms, at a temperature of 175° to 275° C. and passing the vapors therefrom over a dehydrating catalyst at 275° to 425° C.

3. The process of claim 2 in which the compound is α-dimethylaminoisobutyraldoxime.

4. The process of preparing methacrylonitrile which comprises heating at a temperature of 175° C. to 275° C. a compound of the formula

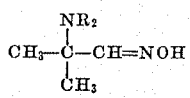

wherein R is an alkyl group of one to four carbon atoms, contacting the vapors therefrom with a dehydrating catalyst at 275° C. to 425° C., treating the gases from the catalyst with a dilute inorganic acid, and separting methacrylonitrile.

5. The process of preparing methacrylonitrile which comprises heating at a temperature of 175° C. to 275° C. a compound of the formula

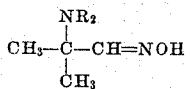

wherein R is an alkyl group of one to four carbon atoms, contacting the vapors therefrom with a silica gel catalyst containing phosphoric acid to give it a pH of 2 to 3.5 at 275° C. to 425° C., treating the gases from the catalyst with a dilute inorganic acid, and separating methacrylonitrile.

6. The process of claim 5 in which the compound is α-dimethylaminoisobutyraldoxime.

NEWMAN M. BORTNICK.
DARREL J. BUTTERBAUGH.

REFERENCES CITED

The following references are of record in the file of this patent:

UNITED STATES PATENTS

| Number | Name | Date |
|---|---|---|
| 2,234,566 | Lazier et al. | Mar. 11, 1941 |
| 2,328,984 | Lichty | Sept. 7, 1943 |
| 2,375,005 | King | May 1, 1945 |
| 2,385,550 | Spence | Sept. 25, 1945 |
| 2,394,430 | Crowder | Feb. 5, 1946 |
| 2,404,280 | Dutcher | July 16, 1946 |
| 2,417,024 | Tuerck et al. | Mar. 4, 1947 |

OTHER REFERENCES

Tilden et al., J. Chem. Soc. (London), vol. 65, pp. 324, 325, 326, 333 (1894).

Drew et al., J. Chem. Soc. (London) 1934, pp. 49-50.